US007668503B1

(12) United States Patent
Schumann et al.

(10) Patent No.: US 7,668,503 B1
(45) Date of Patent: Feb. 23, 2010

(54) SECURE REMOTE REPEATER

(76) Inventors: Robert Wilhelm Schumann, 11723 Quay Rd., Oakton, VA (US) 20124; David G Grossman, 518 Woodland Ct. NW., Vienna, VA (US) 22180

( * ) Notice: Subject to any disclaimer, the term of this patent is extended or adjusted under 35 U.S.C. 154(b) by 574 days.

(21) Appl. No.: 11/280,296

(22) Filed: Nov. 17, 2005

Related U.S. Application Data

(60) Provisional application No. 60/628,538, filed on Nov. 18, 2004.

(51) Int. Cl.
*H04Q 7/20* (2006.01)

(52) U.S. Cl. ......................... 455/11.1; 455/7; 455/41.1; 455/41.2; 455/15; 455/39; 370/315; 370/317; 398/126; 398/112; 398/115

(58) Field of Classification Search ................ 455/11.1, 455/7, 41.1, 41.2, 15, 39, 500, 517, 3.03, 455/3.05, 3.06, 403, 422.1, 550.1, 445; 370/315, 370/317; 398/126, 112, 115
See application file for complete search history.

(56) References Cited

U.S. PATENT DOCUMENTS 5,142,397 A * 8/1992 Dockery ..................... 398/126
5,142,398 A * 8/1992 Heep .......................... 398/112
5,392,313 A * 2/1995 Noro .......................... 375/211
7,266,301 B2 * 9/2007 Stanchfield et al. ......... 398/126
2006/0198638 A1 * 9/2006 Stevenson et al. ........... 398/115

* cited by examiner

*Primary Examiner*—Keith T Ferguson
(74) *Attorney, Agent, or Firm*—David Grossman

(57) ABSTRACT

Disclosed is a secure remote repeater. The secure repeater includes a first remote control signal detector, a remote control signal processor and an emitter. Among other functions, the secure repeater can forward secure remote signals to an electronic device using non-secure commands native to that electronic device. Additionally, the secure remote repeater can filter remote signal chatter.

19 Claims, 5 Drawing Sheets

SECURE REMOTE REPEATER

CROSS-REFERENCES TO RELATED APPLICATIONS

This application claims the benefit of U.S. Provisional Application No. 60/628,538, filed Nov. 18, 2004, which is hereby incorporated by reference.

BACKGROUND OF THE INVENTION

New universal remote devices designed to turn off almost any television now have the capability of interfering with televisions in public and private forums. An example of such a device is marketed as "TV-B-Gone" by Cornfield Electronics, Inc. of San Francisco, Calif. This device, which looks like an automobile remote, has just one button. When activated, it spends over a minute flashing out over 200 different codes to turn off televisions, the most popular brands first. This kind of non-normal repetitive rapid fire output of control codes that is outside the normal intended operation of a device is an example of chatter. Broadly speaking, chatter may be any type of interfering signals that interfere with the operation of a device.

What is needed is a device that can prevent universal remote devices from controlling devices through their normal remote control reception mechanism against the device owners wishes.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DESCRIPTION OF THE INVENTION

Figure 1:
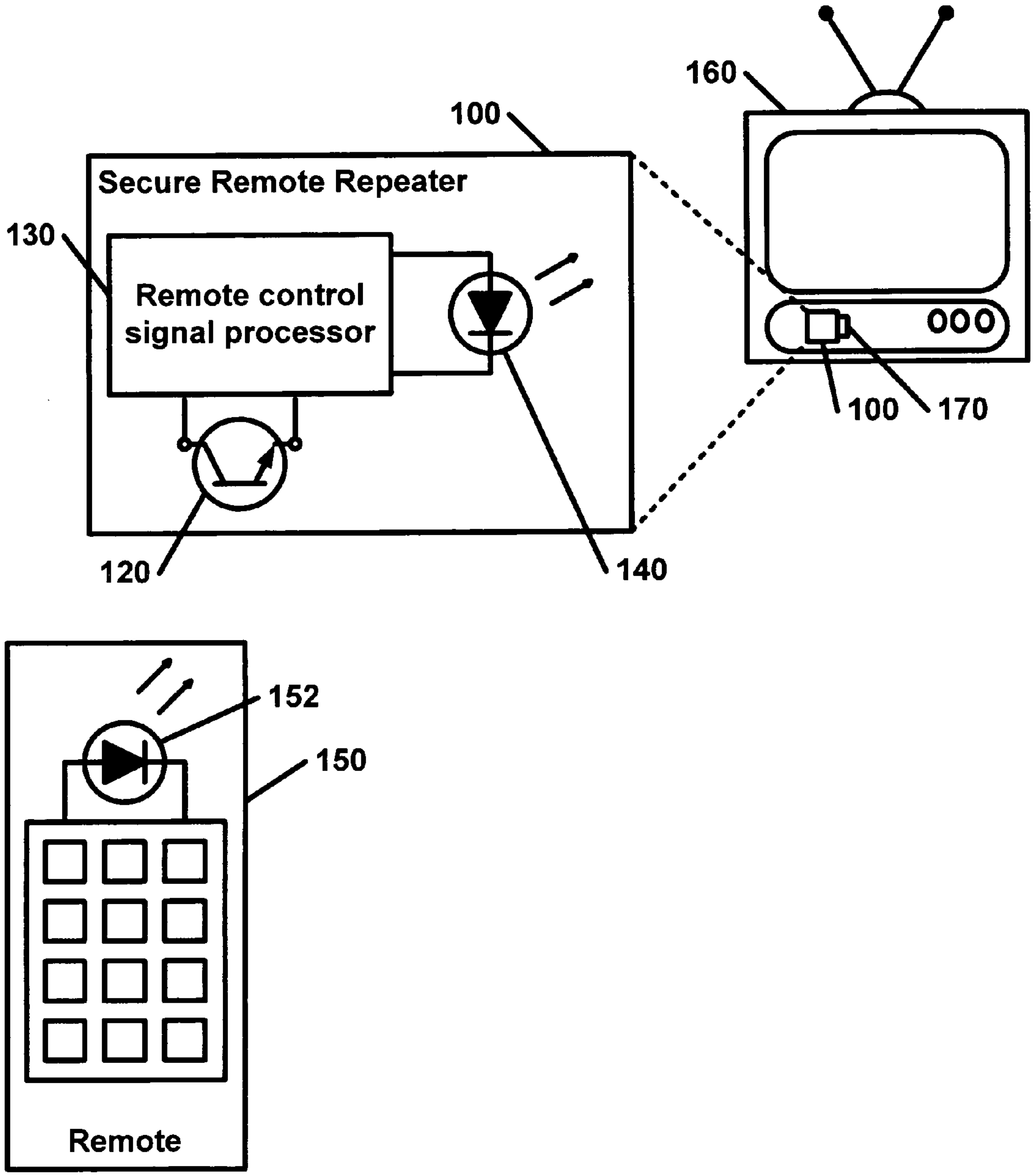
FIG. 1 is a diagram of a system including a secure remote repeater as per an aspect of an embodiment of the present invention.

Remote controls for TV's, VCR's, and other audio/video equipment have utilized infra-red (IR) for communications for many years. Most of these remotes modulate the infrared signal at a transmitted frequency from 36 to 50 kHz. To overcome interference between remotes, the consumer electronic industry devised ways to prevent remote controls for one electronic device from controlling a different electronic device. This is often accomplished by the different remote controls using different codification at the infrared frequencies. Additionally, these remotes avoid interference by using different combinations of bits to code the transmitted data.

There are several common IR remote control codifications in use. Phillips developed a codification called RC5 that uses a fixed bit length and fixed quantity of bits. NEC, APEX, Hitachi, and Pioneer's schemes use a "bit-width" codification, Sony uses a "bit-width" codification, and JVC uses a "space-width" codification. These codification schemes are mentioned as examples of codification schemes that may be used by the present invention. It is intended that the present invention may use any codification scheme (including physical transmission mechanisms) capable of communicating remote control commands, including codification schemes that are more secure or less secure than these examples.

The present invention is a secure remote repeater. This secure remote repeater may be created as a stand alone device or as a software application running on or integrated within a device capable of communicating and/or receiving remote control commands. The secure repeater includes a first remote control signal detector 120, a remote control signal processor 130 and a remote control signal emitter 140.

The first remote control signal detector 120 is preferably capable of receiving remote control signals from remote control device(s) 150. The signal detector may be a simple or sophisticated detector. An example of a simple detector is an infrared NPN phototransistor or photodiode. One manufacturer of these types of devices is Optek Technology Inc. of Carrollton, Tex. An example of a more sophisticated detector is an IR receiver module for remote control systems that could include additional circuitry with a simple detector to demodulate and process received signals. One example of such an IR receiver module is a TSOP348, available from Vishay Intertechnology, Inc. of Malvern, Pa.

The remote control signal processor 130 may include a signal input connected to the first remote control signal detector 120 and a signal output connected to the an emitter 320. The remote control signal processor 130 may perform one or a multitude of functions. A first function may be to generate new remote control signals. These new remote control signals may be generated in response to received remote control signals. For example, remote control signal processor 130 may convert remote control signals specific for one device to remote control signals specific for another device. Additionally, the remote control signal processor 130 may convert secure remote control signals to non-secure remote control signals. Secure remote control signals may include encrypted signals, signals that hop between frequencies, signals that use new codes, etc.

A second function of the remote control signal processor 130 may be to filter remote control signal chatter. Chatter is a condition where a multitude of remote control commands are being transmitted in a short period of time. More specifically, chatter may include a sequence of at least two distinct remote control signals, where each of the distinct remote control signals is intended to control different devices. Chatter may be an indication that a remote control device is trying to operate an electronic device such as television set 160 without knowing exactly which command will operate it.

Additionally, the remote control signal processor 130 may perform other types of filtering related functions. For example, the control signal processor 130 may have detection options, where it detects different patterns types such as: an rc-5 coded signal followed by a pulse width modulated signals; specific transmission of a frequency sequence; or specific codes. The control signal processor 130 may also act upon certain "good" command sets and ignore all other command sets. To further this function, the control signal processor 130 may have a learning mode, in which the system learns what a "good" command set is.

Learning a "good" command set may involve setting the secure remote repeater 100 in a learning mode for a period of time where any codification (and/or sequence) of codes is presented to it is learned to be "good." Additionally, the secure remote repeater 100 may be programmed using an external device such as a computer program. The computer program may provide a user interface to assist a user in programming the secure remote repeater 100. This programming could take place either through a hard wired connection or using the detector 120. The secure remote repeater may also have a preprogrammed set of possibly "good" command sets. During the learning mode, the user may merely need to teach the secure remote repeater which one(s) of the preprogrammed command sets are "good."

One embodiment of the learning mode could involve repeating good commands to the secure remote repeater 100. The repeated signal could be received and decoded. The signal type as well as specific code may then be stored. When the secure remote repeater 100 is now in an operational mode, it may compare newly received signals with the stored signals. If there is a match, the signal may be repeated. If there is no match, the signal may not be repeated.

The secure remote repeater 100 could have an operational mode where it behaves differently when there is chatter, and when there is no chatter. For example, when chatter is not detected, the secure remote repeater may repeat all commands normally. However, where chatter is detected, the secure remote repeater 100 may only repeat the "good" commands or only pass special commands. A special command may be a code that is not normally used in a commercial remote. One such command could be a regular command encapsulated between a series of other characters, or specially encrypted or scrambled for the secure remote repeater 100.

In some embodiments, the secure remote repeater 100 may implement different buffer lengths. These implementations may be programmed to repeat longer regular sequences to deal with environments (such as global remotes) where a legitimate sequence of off commands is received to power down a series of devices, for example a TV, DVD player, cable box, and receiver. This sequence may be treated as a "good" command sequence and thus detected, preserved and passed through while a longer regular sequence may be detected as chatter and not passed through.

The emitter 140 should be capable of emitting new remote control signals. Preferably, this emitter 140 may be mounted near a second remote control signal detector 170 such that the emitter 140 blocks remote control signals originating from sources other than the emitter 140. As shown on FIG. 1, the blockage may be accomplished by mounting the secure remote repeater 100 directly over the second remote control signal detector 170. In this case, the second remote control signal detector 170 is part of television set 160. It is envisioned that this technique of blockage may be practiced with other devices such as radios, stereos, VCR's, DVR's, computers, etc.

The secure remote repeater 100 may also emit interfering signals through emitter 140. This signal may be transmitted intersperses with or in parallel with the repeated signals. In some embodiments, the interfering signal may use its own emitter. An interfering signal is a signal that effectively prevents a device such as television set 160 from receiving remote control signals such as non-secure remote control signals. Interfering signals may include a large amplitude signal that effectively drowns out other remote control signals. Other interfering signals include out of phase signals, counter phase signals. Additionally, intelligent counter measure signals may be used.

Figure 5:
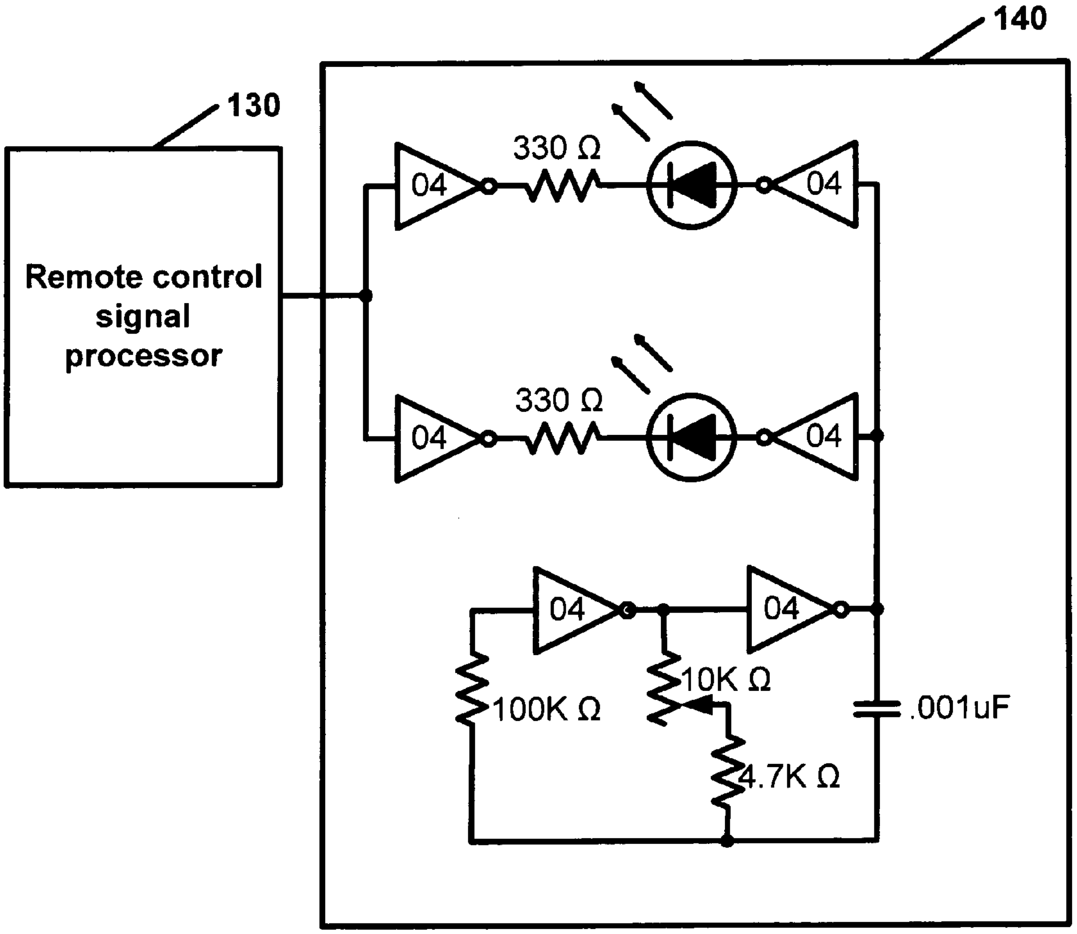
FIG. 5 is a diagram of an emitter signal generation circuit.

FIG. 5 is a diagram of an exemplary emitter signal generation circuit. As shown, the control signal is generated by remote control signal processor 130. The inverters are 74HCT04 inverters and all unused inputs are connected to 5V through 10K resistors (nominal). When activated, this circuit modulates the IR LEDs. The activation may be made according to a defined codex.

Figure 3:
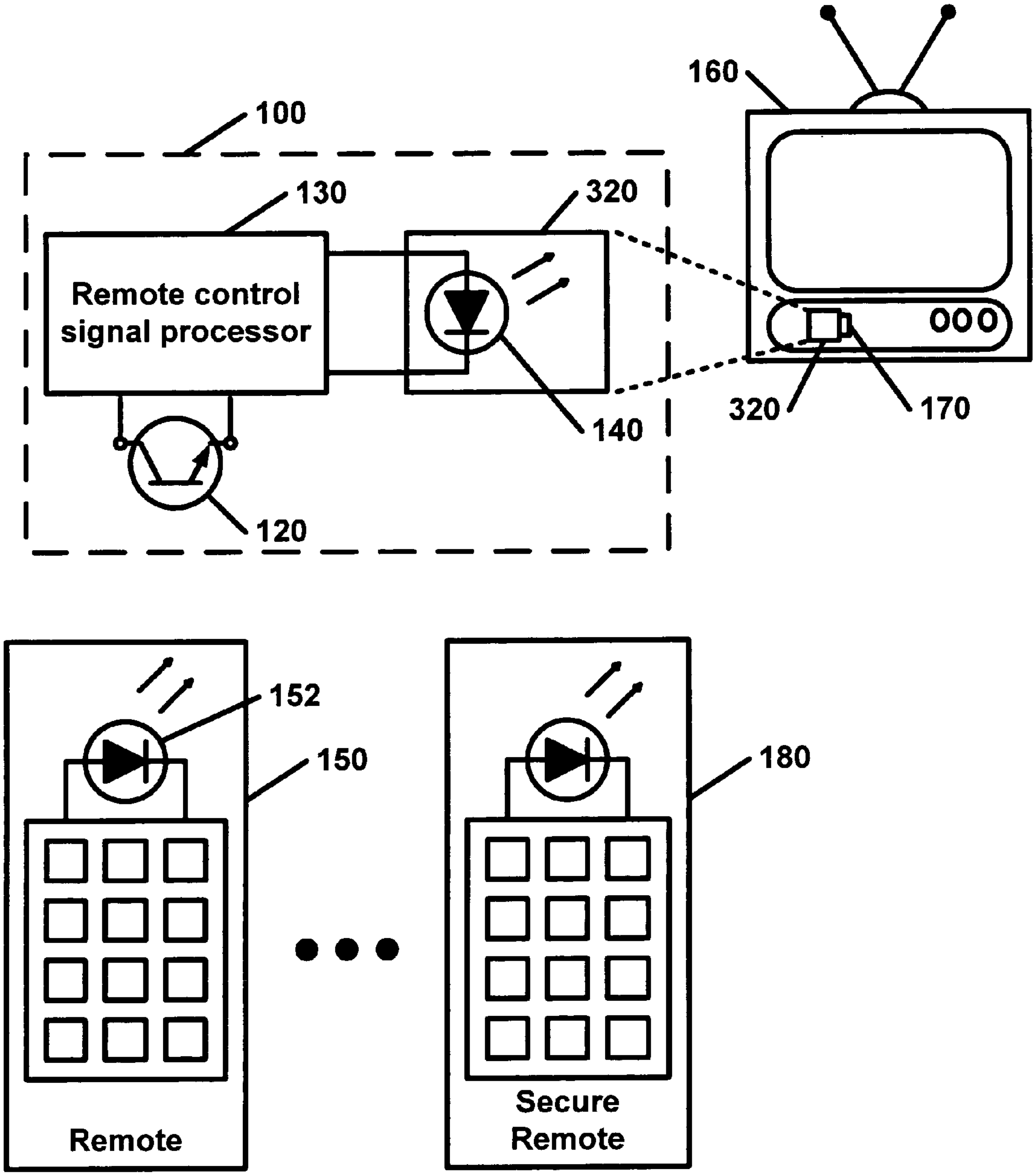
FIG. 3 is a diagram of a system including a secure remote repeater, a remote, and a secure remote as per an aspect of an embodiment of the present invention.

As shown in FIG. 3, the emitter 140 may be part of an emitter assembly 320 that is separate and distinct from the remote control signal processor 130. By doing this, it may make it easier to fit the emitter 140 in a good blocking location. Additionally, the emitter assembly 320 may be customized to create a good fit over the second remote control signal detector 170. The customization may be made by forming the emitter assembly 320 into custom shapes and/or using special materials such as foam or IR filters (possibly directional).

When the emitter 140 is an RF emitter, the emitter assembly 320 may include a shield to attenuate external RF signals. To this end the emitter assembly 320 may be shaped to encapsulate at least the antenna part of the second remote control signal detector 170.

Figure 4:
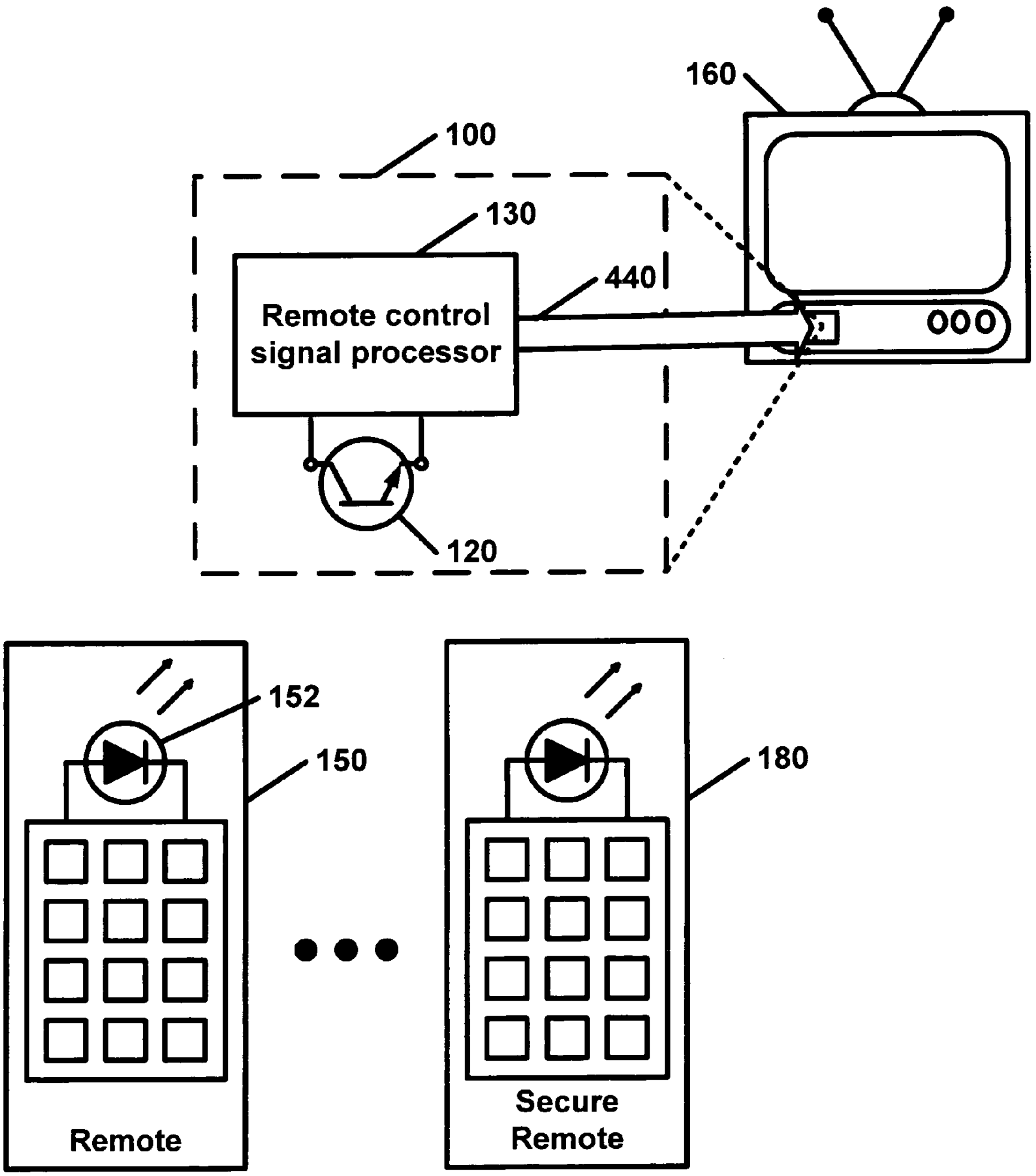
FIG. 4 is a diagram of a system where the secure remote repeater is built into a device as per an aspect of an embodiment of the present invention.

FIG. 4 shows a diagram of a system where the secure remote repeater is embedded in a device such as a television set. In this exemplary embodiment, emitter 140 is shown as direct connection 440. Direct connection 440 may be any type of connection capable of communicating processed remote control signals to the device. This connection 440 may even be copper wire. An advantage of this embodiment is that the secure remote repeater 100 does not need to be attached to a preexisting device.

Figure 2:
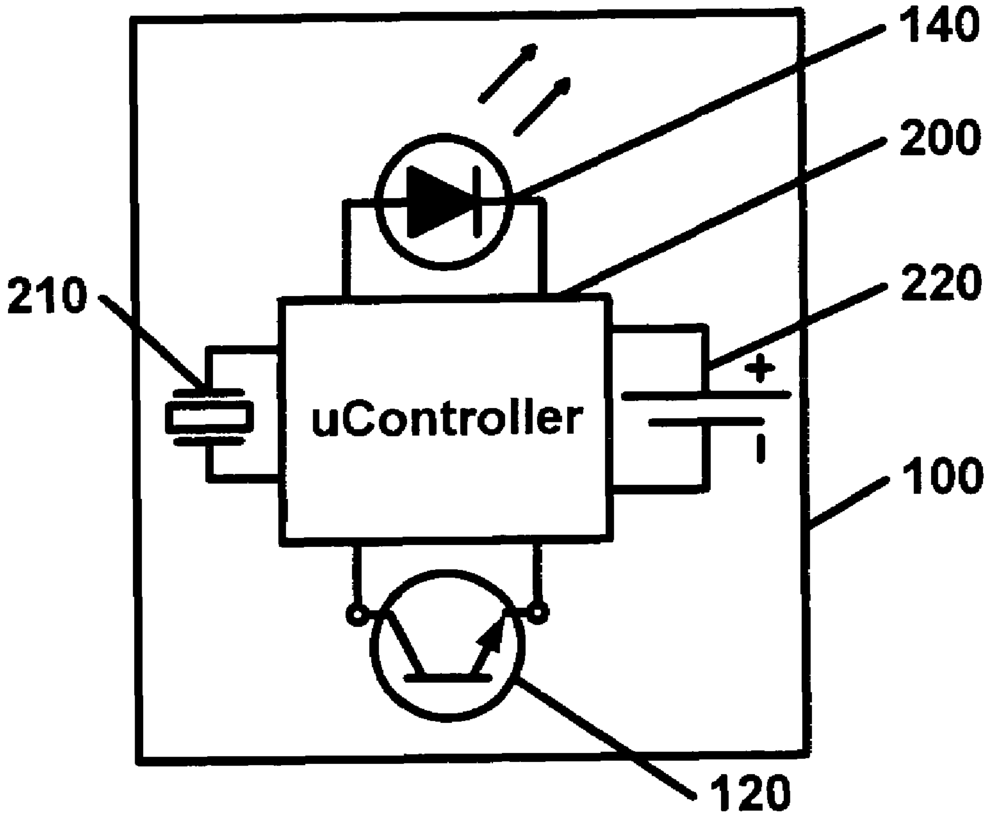
FIG. 2 is a diagram a secure remote repeater utilizing a microcontroller as per an aspect of an embodiment of the present invention.

The FIGS. 1 through 3 show embodiments of the present invention where the secure remote repeater 100 operates in the infrared spectrum. In this case, the first remote control signal detector 120 and the emitter 140 are capable of detecting and emitting infrared signals respectively. In a radio frequency embodiment, the first remote control signal detector 120 and the emitter 140 are preferably capable of detecting and emitting radio frequency signals respectively.

This remote control signal processor 130 may be implemented using software on a larger computer that has an emitter 140 and detector 120, or on a microcontroller based device. FIG. 2 shows a remote control signal processor 130 which includes a microcontroller device 200. There are many microcontroller devices that may be utilized. For example, Intel Corp. of Santa Clara, Calif. manufactures a line of 8051 controllers, Motorola Inc. of Schaumburg, Ill. manufactures a line of 6805 devices, Microchip Technology Inc. of Chandler, Ariz. manufactures a line of PIC microcontrollers. Typical components in addition to the emitter 140 and detector 120 include a crystal or ceramic resonator 210 and a power source such as a battery 220. Example code to decode the Phillips RC-5 codification has been made available at the website of Ust Research Inc. of Orlando Fla.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, the claimed invention is shown using IR frequency remote control technology, however, it is envisioned that other types of remote control technology may be utilized, including hard wired technology where the secure remote repeater is hard wired into the remote communications channel.

What is claimed is:

1. A secure repeater comprising:

a) a first remote control signal detector capable of receiving remote control signals;

b) a remote control signal processor, said "remote control signal processor" including:

i) a signal input connected to said "first remote control signal detector"; and ii) a signal output;

c) an emitter connected to said signal output, said "emitter" capable of:

i) being mounted near a second remote control signal detector such that said "emitter" interferes with said "second remote control signal detector" from acting upon said "remote control signals" originating from sources other than said "emitter"; and ii) emitting new remote control signals; and wherein said "remote control signal processor" is capable of filtering remote control signal chatter, signal chatter being a sequence of at least two distinct remote control signals intended to control different devices transmitted in a short period of time.

2. A secure repeater according to claim 1, wherein said "filtering remote control signal chatter" includes physically blocking said "signal chatter".

3. A secure repeater according to claim 1, wherein said "filtering remote control signal chatter" includes modifying said "signal chatter".

4. A secure repeater according to claim 1, wherein said "filtering remote control signal chatter" includes interfering with said "signal chatter".

5. A secure repeater according to claim 1, wherein said "remote control signal processor" is capable of generating "new remote control signals".

6. A secure repeater according to claim 1, wherein said "remote control signal processor" is capable of converting remote control signals specific for one device to remote control signals specific for another device.

7. A secure repeater according to claim 1, wherein said "remote control signal processor" is capable of receiving remote control signals specific for one device and then generating new remote control signals specific for another device.

8. A secure repeater according to claim 1, wherein:

a) said "first remote control signal detector" is capable of detecting infrared signals;

b) said "second remote control signal detector" is capable of detecting infrared signals; and c) said "emitter" is capable of emitting infrared signals.

9. A secure repeater according to claim 1, wherein:

a) said "first remote control signal detector" is capable of detecting radio frequency signals;

b) said "second remote control signal detector" is capable of detecting radio frequency signals; and c) said "emitter" is capable of emitting radio frequency signals.

10. A secure repeater according to claim 1, wherein:

a) said "first remote control signal detector" is capable of detecting non-infrared signals;

b) said "second remote control signal detector" is capable of detecting non-infrared signals; and c) said "emitter" is capable of emitting non-infrared signals.

11. A secure repeater according to claim 1, wherein said chatter includes a sequence of at least two distinct remote control signals, each of said "at least two distinct remote control signals" are intended to control a different device.

12. A secure repeater according to claim 1, wherein said "remote control signal processor" includes a microcontroller device.

13. A secure repeater according to claim 1, further including a remote control capable of emitting secure remote control signals.

14. A secure repeater according to claim 13, wherein said "remote control signal processor" is capable of converting said "secure remote control signals" to non-secure remote control signals.

15. A secure repeater according to claim 1, further including a user interface.

16. A secure repeater according to claim 15, wherein said user interface is used to control a learning function.

17. A secure repeater according to claim 16, wherein said learning function is capable of learning legitimate remote codes.

18. A secure repeater according to claim 16, wherein said learning function is capable of learning remote sequences that incorporate different codes.

19. A secure repeater according to claim 16, wherein said learning function is capable of learning the length of a burst.

* * * * *